(12) United States Patent
Shimizu

(10) Patent No.: US 9,884,653 B2
(45) Date of Patent: Feb. 6, 2018

(54) B PILLAR WITH PARTIAL STRENGTH CHARACTERISTICS

(71) Applicant: Benteler Automobiltechnik GmbH, Paderborn (DE)

(72) Inventor: Tomohiro Shimizu, Tochigi (JP)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 15/449,594

(22) Filed: Mar. 3, 2017

(65) Prior Publication Data

US 2017/0253276 A1 Sep. 7, 2017

(30) Foreign Application Priority Data

Mar. 4, 2016 (DE) .................... 10 2016 103 962

(51) Int. Cl.
| | |
|---|---|
| *B60N 99/00* | (2006.01) |
| *B62D 25/04* | (2006.01) |
| *B62D 29/00* | (2006.01) |
| *B62D 21/15* | (2006.01) |

(52) U.S. Cl.
CPC .......... *B62D 25/04* (2013.01); *B62D 29/007* (2013.01); *B60Y 2306/01* (2013.01); *B60Y 2410/124* (2013.01); *B62D 21/157* (2013.01)

(58) Field of Classification Search
CPC .... B62D 25/04; B62D 29/007; B62D 21/157; B60Y 2306/01; B60Y 2410/124
See application file for complete search history.

(56) References Cited

U.S. PATENT DOCUMENTS

| | | | |
|---|---|---|---|
| 2010/0308623 A1 | 12/2010 | Bodin et al. | |
| 2012/0319431 A1 | 12/2012 | Bodin et al. | |
| 2014/0191536 A1* | 7/2014 | Elfwing | B62D 25/04 296/193.06 |
| 2015/0353146 A1* | 12/2015 | Bohner | C21D 9/46 148/240 |
| 2016/0052557 A1* | 2/2016 | Tyan | B62D 21/152 296/187.01 |

FOREIGN PATENT DOCUMENTS

| | | |
|---|---|---|
| DE | 102014112740 A1 | 3/2016 |
| EP | 2209696 B1 | 1/2014 |

OTHER PUBLICATIONS

Office Action issued in German Application No. 10 2016 103 962.4, dated Nov. 7, 2016.

* cited by examiner

*Primary Examiner* — Lori L Lyjak
(74) *Attorney, Agent, or Firm* — Hauptman Ham, LLP

(57) ABSTRACT

A B pillar for a motor vehicle is produced as a hot-stamped and press-hardened component composed of a hardenable steel alloy, wherein a lower length section extends over less than 40% of the length (L) of the B pillar in a longitudinal direction and at least regionally has different strength values in relation to an upper length section, which B pillar is, in the lower length section, in at least one cross section, mutually different strengths are formed, and in the lower length section, a soft material structure is formed regionally.

11 Claims, 5 Drawing Sheets

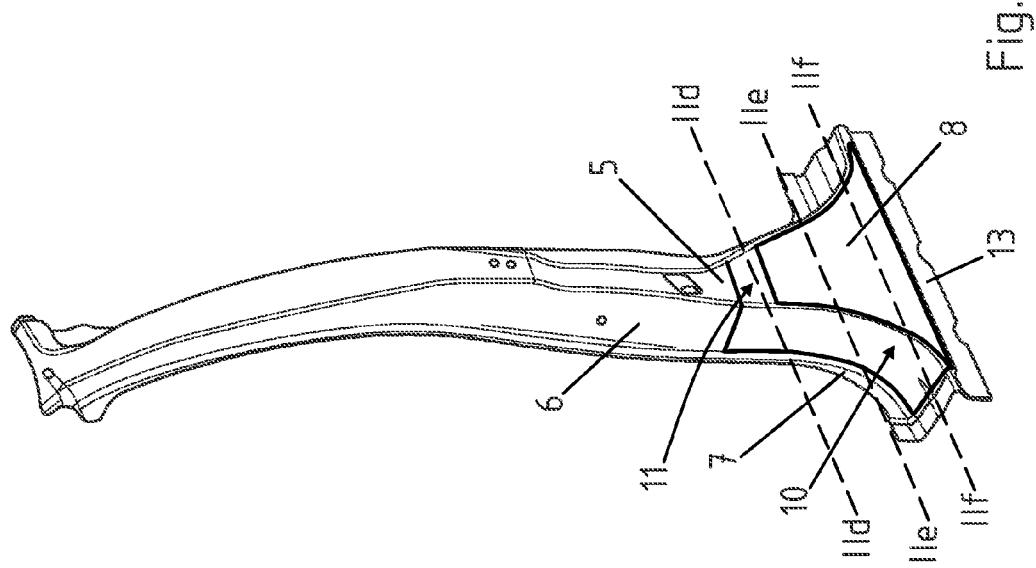
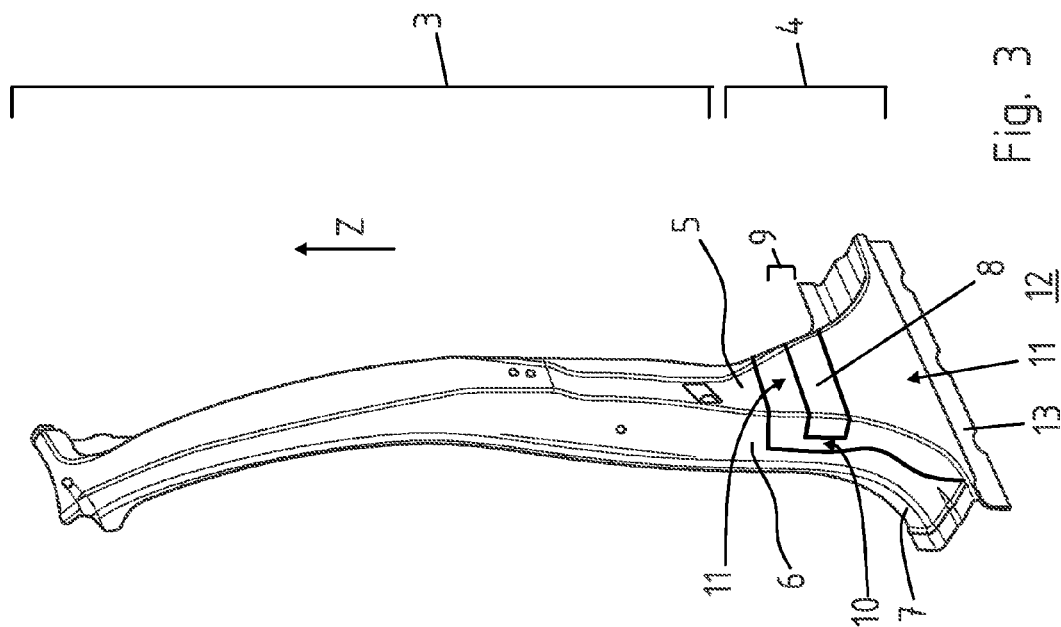

B PILLAR WITH PARTIAL STRENGTH CHARACTERISTICS

CROSS REFERENCE TO RELATED APPLICATIONS

The present application claims priority from German Application Number 10 2016 103 962.4, filed Mar. 4, 2016, the disclosure of which is hereby incorporated by reference herein in its entirety.

BACKGROUND OF THE INVENTION

1. Field of the Invention

The invention relates to a B pillar for a motor vehicle, produced as a hot-worked and press-hardened component composed of a hardenable steel alloy, and more particularly, to a produced hot-worked and press-hardened component composed of a hardenable steel alloy.

2. Description of the Related Art

Some motor vehicle components can be produced by hot-stamping and press hardening. For this purpose, a blank composed of a hardenable steel alloy, for example, a manganese-boron steel, is austenitized at least regionally, is deformed in the hot state, and is subsequently rapidly cooled such that quench hardening, also referred to as press hardening, occurs. In this way, it is possible to realize tensile strength values of over 1400 MPa.

It is thus possible to produce motor vehicle structural components, in particular B pillars, roof frames, beams, sills and crossmembers, which have high strength characteristics. The stability of the motor vehicle body in the event of an accident thus remains ensured. At the same time, it is made possible to use smaller wall thicknesses, such that the weight of the motor vehicle body can be reduced, and thus also the $CO_2$ emissions are minimized.

A generic motor vehicle pillar, in particular B pillar, is disclosed in EP 2 209 696 B1. A lower length section is formed with a relatively soft material structure in relation to an upper length section. This offers the advantage that, in the event of a side-on collision, the motor vehicle B pillar deforms in targeted fashion, and dissipates energy in the process, but complete crack formation or, for example, a breakaway from the attached sill is prevented.

US 2012/0319431 A1 discloses a motor vehicle pillar which, in cross section, is in the form of a hat-shaped profile. Flanges are of soft form over a relatively large length section in their longitudinal direction, wherein the rest of the cross section has a hard material structure or transition region.

DE 10 2014 112 740 A1 discloses a motor vehicle pillar which, in the lower region in a longitudinal direction, has strips with mutually different strength. Here, a hard strip is coupled to the sill. The hard strip does not extend beyond a fold edge.

SUMMARY OF THE INVENTION

A B pillar for a motor vehicle is produced as a hot-stamped and press-hardened component composed of a hardenable steel alloy. A lower length section extends over less than 40% of the length of the B pillar and at least regionally has different strength values in relation to the remaining upper length section. According to the invention, the B pillar is distinguished by the fact that, in the lower length section, in at least one cross section, two regions with mutually different strength are formed, and in the lower length section, a soft material structure is formed regionally.

The different regions are in the form of a soft region, transition region, hard region and/or transition section. These extend in each case in parts in the cross section and in the longitudinal direction of the B pillar.

In particular, in the installed state, those regions which are directed outward in the vehicle transverse direction have a lower strength than those regions which are directed toward the vehicle interior in the vehicle transverse direction in at least one cross section. The mutually different strengths in the lower length section may in this case be formed in that the mutually different strengths in the cross section extend over a height region of a few centimeters up to 40 centimeters. It is however also possible for the entire lower length section to have in each case mutually different strengths in the cross section.

The invention also relates to a B pillar which likewise has an upper length section and a lower length section, wherein the lower length section extends over less than 40% of the length of the B pillar. The B pillar has, in each cross section at least in the lower length section, an in each case homogeneous material structure, which is consequently uniform in cross section. The material structure changes over the length. The upper length section preferably has exclusively a hard material structure. It is alternatively also possible for the joining flanges in the edge region of the B pillar in the upper length section to have a soft structure. The lower length section is in turn formed so as to be split into three parts in the longitudinal direction. An upper part has a soft material structure, a middle part has a hard material structure, and a lower part again has a soft material structure. In each case one transition section is formed between the individual parts and between the upper and lower length sections.

In the context of the invention, mutually different strengths means that hard regions and soft or ductile regions exist. The hard regions, that is to say the hard material structure, preferably have a tensile strength Rm of greater than 1100 MPa, preferably greater than 1300 MPa, very particularly preferably greater than 1400 MPa and preferably greater than 1500 MPa, and are referred to as super-high-strength. The soft regions, also referred to as soft material structure, have a tensile strength of less than 1000 MPa, preferably of between 500 MPa and 1000 MPa, in particular between 600 MPa and 900 MPa. In the hard regions, it is substantially the case that a martensitic structure is formed, with a bainitic or ferritic/pearlitic structure being formed in the soft regions. A mixed structure is formed in the transition regions or transition section.

More specifically, a transition section is formed between upper length section and lower length section. The transition section extends in the longitudinal direction over a length of less than 100 mm, in particular less than 50 mm, and preferably less than 30 mm.

The lower length section itself extends, in turn, over a length in the longitudinal direction of less than 40% of the total length, preferably less than 38%, preferably less than 35%, in particular less than 33%, particularly less than 32%, preferably less than 30%, and more specifically less than 28% of the length of the B pillar.

The B pillar itself is preferably, in cross section, at least over sections of the length, in particular over the entire length, in the form of a hat-shaped profile. This means it has a web, limbs projecting from the web, and flanges projecting, in turn, from the limbs. In an installed position, the web and the flanges are preferably oriented in a motor vehicle longitudinal direction. The limbs are oriented in a motor vehicle transverse direction. Both the web and the limbs may run in each case rectilinearly in the cross section. However, it is also possible for both the web and the limbs to have a progressive or degressive profile in the cross section, or to additionally be embossed, for example by virtue of a bead or the like being stamped in. The bead would in turn extend in the longitudinal direction of the B pillar, consequently in a motor vehicle vertical direction.

In order that mutually different strength regions are now set in targeted fashion, it is the case that either partially temperature-controlled hot stamping and press hardening tools are used or else the blank to be deformed is partially temperature-controlled. For example, it is possible here to use a contact heating means, such that temperature-controlled plates set to a temperature can be locally laid onto the blank in targeted fashion and generate a corresponding temperature profile within the blank. The blank that has been temperature-controlled in this way is then placed into the hot working and press hardening tool, and is subjected to hot working and press hardening with, regionally, strength regions set to be soft or ductile. In the context of the invention, it is however also possible for the soft regions to be set only after the homogeneous press hardening, by way of local annealing.

The lower length section is preferably designed such that the web is formed at least partially in the longitudinal direction, and entirely in cross section, and in particular entirely in the longitudinal direction, with a soft material structure or ductile material structure. The limbs projecting from the web are, at least in the vehicle transverse direction, formed regionally as a transition region. The flanges adjoining the limbs are formed with a hard material structure. The flanges are, in the lower length section, formed entirely in the longitudinal direction with a hard or super-high-strength material structure. This offers the advantage that the flanges act as a tensile strut in the event of a lateral intrusion of an object. With the B pillar according to the invention, it is thus possible for crash energy to be dissipated or absorbed owing to the soft web and the limbs formed as a transition region in the material structure. At the same time, however, deformation resistance is ensured by way of the super-high-strength flanges as tensile struts, such that an overly intense undesired deformation is prevented.

It is furthermore particularly preferable for a sill flange to be formed at the lower end of the B pillar. The sill flange extends preferably over the entire width of the lower end of the B pillar and has a soft material structure. In this way, it is possible to perform coupling for example to a sill by way of resistance spot welding, and for a breakaway owing to an overly hard and brittle material structure to be avoided.

BRIEF DESCRIPTION OF THE DRAWINGS

The present invention will now be described, by way of example, with reference to the accompanying drawings, in which:

FIG. 3 shows a motor vehicle B pillar with soft region in the lower length section.

FIG. 4 shows a motor vehicle B pillar with completely soft web in the lower length section.

In the figures, the same reference designations are used for identical or similar components, even if a repeated description is omitted for reasons of simplicity.

DETAILED DESCRIPTION OF SOME EMBODIMENTS

Figure 1:
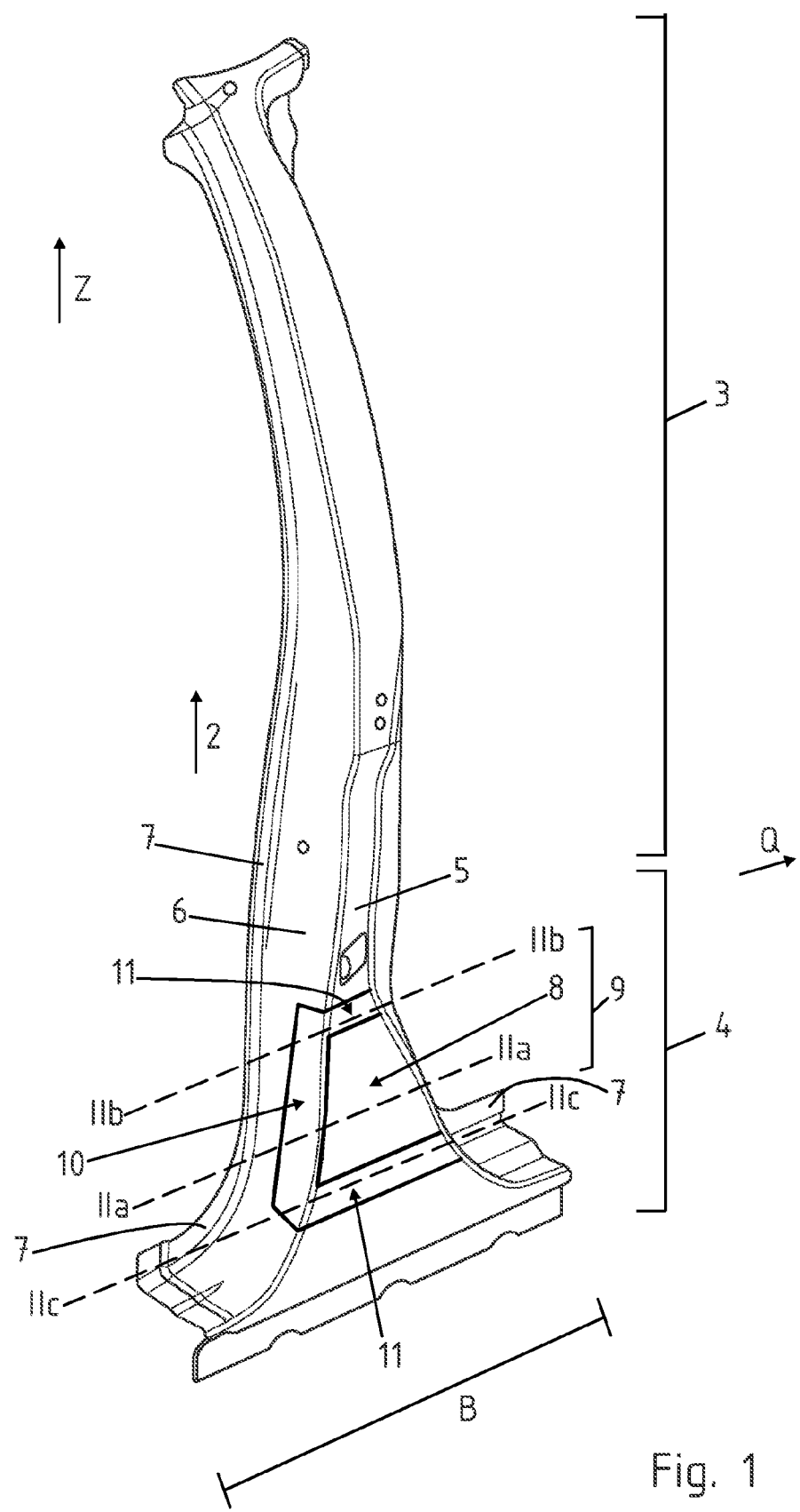
FIG. 1 shows a B pillar according to an embodiment of the invention with a lower length section with mutually different strengths.

FIG. 1 illustrates a B pillar 1 having a length L and extending in its longitudinal direction 2. The B pillar 1 has an upper length section 3 and, adjoining the latter, a lower length section 4. The upper length section 3 and the lower length section 4 extend in each case in the longitudinal direction 2. The lower length section 4 extends over less than 40% of the length in the longitudinal direction 2. In the cross section, the lower length section 4 has regions with mutually different strength.

Figure 2A:
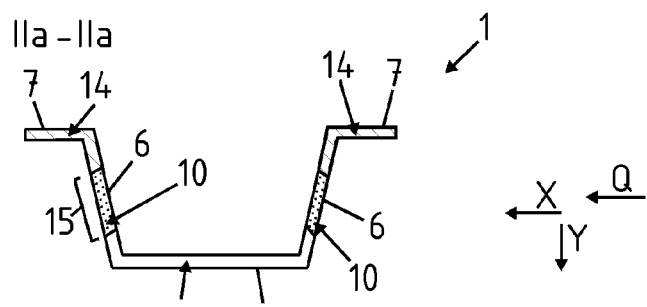
FIGS. 2*a* to 2*f* show different cross-sectional views.

FIG. 2*a* illustrates a cross-sectional view as per IIa-IIa from FIG. 1, from which it can be seen that the B pillar 1 is in the form of a hat-shaped profile in cross section. For this purpose, a web 5 is formed, with limbs 6 extending from the web 5. In turn, a flange 7 projects from each limb 6. The flanges 7 and the web 5 are in this case oriented in a motor vehicle longitudinal direction X. The limbs 6 themselves are formed so as to be oriented substantially in a motor vehicle Y direction. In the context of the invention, this does not mean that the respective orientation runs parallel to the respective motor vehicle direction; angles in the range of 10° or 20° with respect to the respective motor vehicle direction are also to be understood as being oriented within the meaning of the invention. The flanges 7, the limbs 6 and/or the web 5 in each case do not need to run rectilinearly as illustrated. They may also run in curved fashion or be of stepped form.

A soft region 8 or a relatively soft material structure is formed in the web 5. The soft region 8 extends, in the longitudinal direction 2, over a partial length 9 of the lower length section 4. The soft region 8 is also formed in a part of the limb 6. The soft region 8 is surrounded laterally by a respective transition region 10, or at the top by a transition section 11. The transition region 10 is in this case preferably formed over a partial length 15 in the limbs 6, such that the flanges 7 illustrated in FIG. 2 have a hard material structure or hard region 14, but the limbs 6 likewise also have, over a remaining length, a hard region 14. At the top side of the soft region 8 in relation to the motor vehicle vertical direction Z, there is formed a transition section 11, wherein the transition section 11 is, so to speak, preferably also the transition from the lower length section 4 to the upper length section 3. The upper length section 3 of the B pillar 1 preferably has a hard material structure.

Figure 2B:
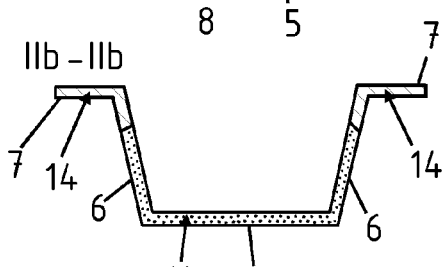

FIG. 2*b* illustrates a section line IIb-IIb from FIG. 1. It can be clearly seen that the transition section 11, with a mixed structure composed of martensite, ferrite/pearlite and/or bainite, extends over the web 5 and parts of the limbs 6. The flanges 7 and the remaining parts of the respective limbs 6 have a hard region 14.

Figure 2C:
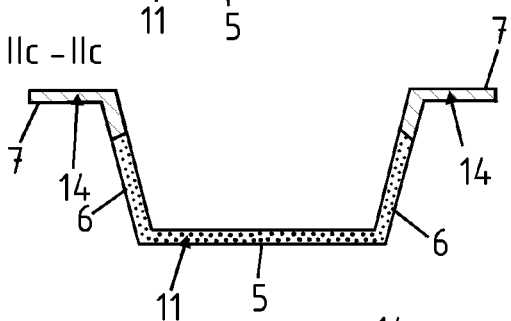

FIG. 2*c* illustrates a cross section relating to the section line IIc-IIc from FIG. 1. Here, it can be seen that, below the soft region 8 in relation to the motor vehicle vertical direction Z, there is formed a further transition section 11, analogously to FIG. 2*b*. The hat-shaped profile is of greater width. In turn, a hard region 14 with super-high-strength material structure is formed in the flange 7. A transition section 11 with a mixed structure is formed in the web 5 and in the limbs 6.

FIG. 3 illustrates an alternative design variant in relation to FIG. 1. It can be seen that the soft region 8 is formed in the web 5, wherein the soft region 8 in turn extends over a partial length 9 of the length of the lower length section 4. Above the soft region 8 in relation to the motor vehicle vertical direction Z, there is formed a transition section 11. Below the soft region 8 in relation to the motor vehicle vertical direction Z, there is likewise formed a transition section 11. A mixed structure is formed in the transition section 11, and a sill flange 13 is arranged at a lower end 12. Said sill flange 13 has a soft material structure, identical or similar to the soft region 8 of the web 5. The transition regions 10 are formed in the region of the limbs 6, wherein a remaining region of the limbs 6 and the flanges 7 themselves are in turn in the form of a super-high-strength material structure.

FIG. 4 illustrates an alternative design variant in relation thereto. The entire lower length section 4 is substantially in the form of a soft material structure in the region of the limb 6, that is, the soft region 8. The limbs 6 are formed entirely as a transition region 10 with a mixed structure. The flanges 7 are in the form of a super-high-strength material structure. The lower sill flange 13 is likewise in the form of a soft material structure, such that the soft region 8 of the web 5 transitions into the soft material structure of the sill flange 13.

Consequently, the B pillar 1 as shown in FIG. 4 has mutually different strength values in each cross section of the lower length section 4. Above the lower length section 4 in relation to the motor vehicle vertical direction Z, there is formed a transition section 11 in which the super-high-strength material structure of the upper length section 3 transitions into the soft material structure of the web 5 of the lower length section 4. The soft region 8 of the lower length section 4 can thus extend, in the cross section or transverse direction, over the entire web 5, and furthermore preferably partially over the limbs. The soft region 8 preferably extends in the region between 1 and 50% of the limb, preferably between 10 and 40% of the limb 6.

Figure 2D:
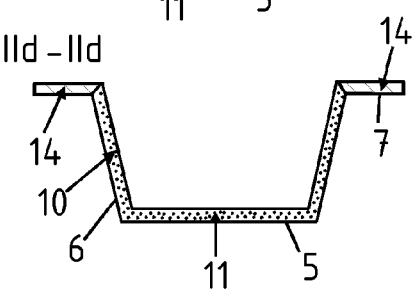
Figure 2E:
Figure 2F:
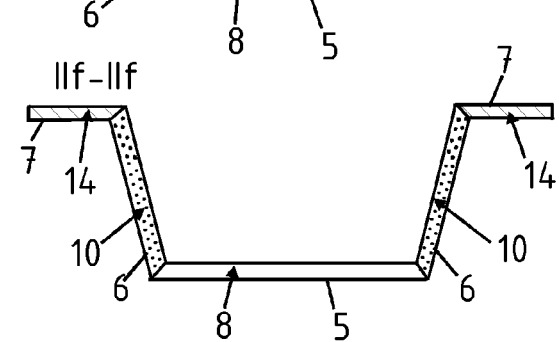

FIGS. 2d, 2e, and 2f illustrate a respective cross section as per the section line IId-IId, IIe-IIe, and IIf-IIf from FIG. 4. In FIG. 2d, the flange 7 has a hard region 14. The limb 6 has a transition region 10, and a transition section 11 is formed in the web 5. A mixed structure is formed in each case in the transition region 10 and transition section 11, and a hard region 14 with super-high-strength material structure is formed in the flange 7. In FIG. 2e, a mixed structure is formed only in the web 5, and a transition region 10 with a mixed structure is formed in the limb 6. The same applies to the cross section as per FIG. 2f. In this case, too, a soft region 8 is formed over the entire web 5, and a transition region 10 with mixed structure is formed in the limbs 6, and a hard region 14 is formed in the flanges 7.

Figure 5:
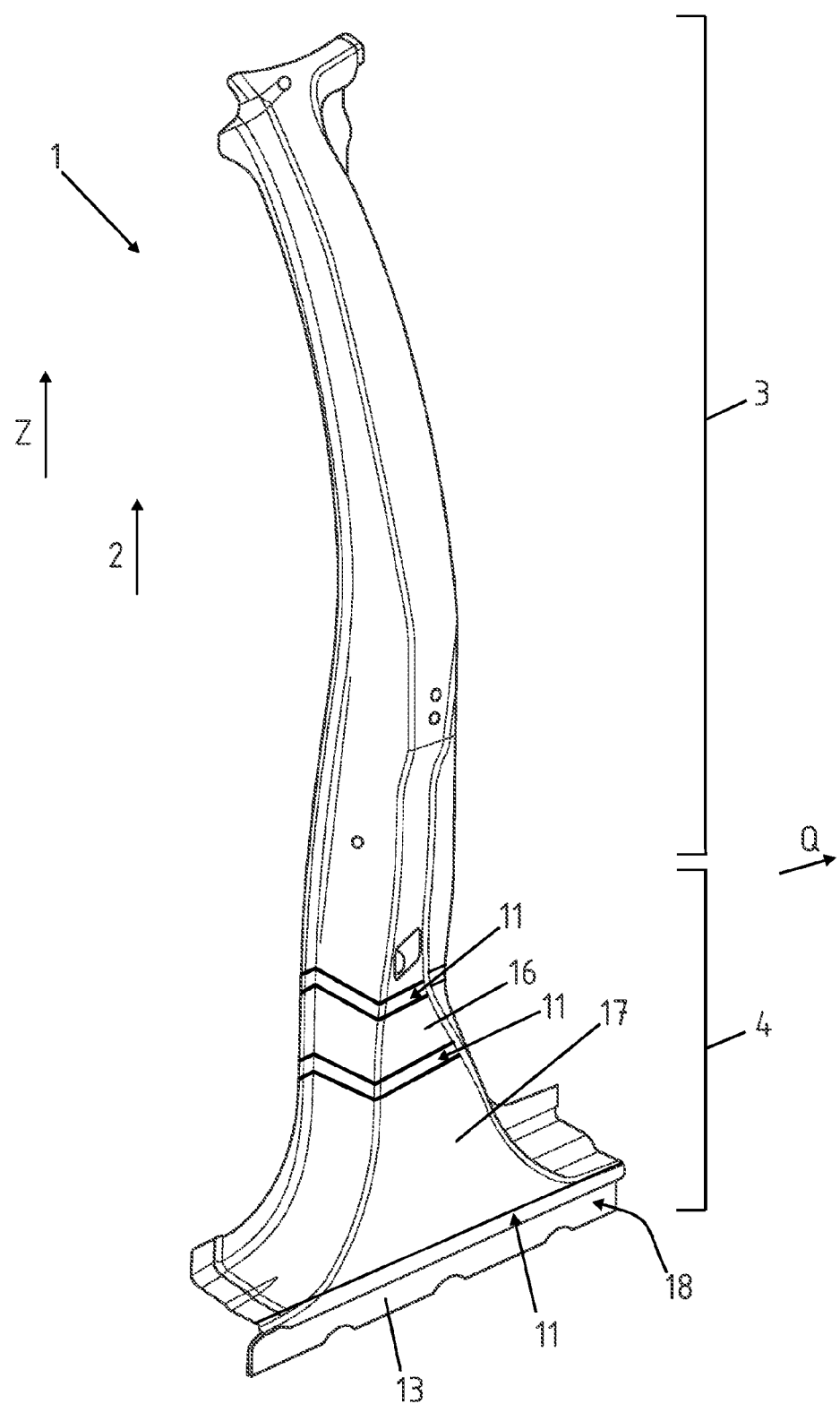
FIG. 5 shows an alternative embodiment of the B pillar with, in cross section, an in each case homogeneous material structure and a lower length section divided into three.

FIG. 5 illustrates an alternative embodiment of the B pillar 1 for a motor vehicle. The B pillar also has, in its longitudinal direction 2 which, in the installed state, is oriented in the motor vehicle vertical direction Z, an upper length section 3 and a lower length section 4. The lower length section 4 is furthermore divided into three parts, an upper part 16, a middle part 17 and a lower part 18. In the preferred design variant, the lower part 18 is the sill flange 13. The lower part 18 extends in the longitudinal direction 2 over a greater region than only the sill flange 13. The upper part 16 and the lower part 18 have a soft material structure. The middle part 17 has a hard material structure. All cross sections in the transverse direction Q have in each case a homogeneous material structure. Consequently, the entire upper part 16 is, in cross section, formed in each case with a soft material structure, the middle part 17 is, in cross section, formed in each case with a hard or super-high-strength material structure, and the lower part 18 is formed with a soft material structure. Between the individual parts 16, 17, 18 or length section 3, 4, there extend in each case transition sections 11 in which a mixed structure is present.

Figure 6:
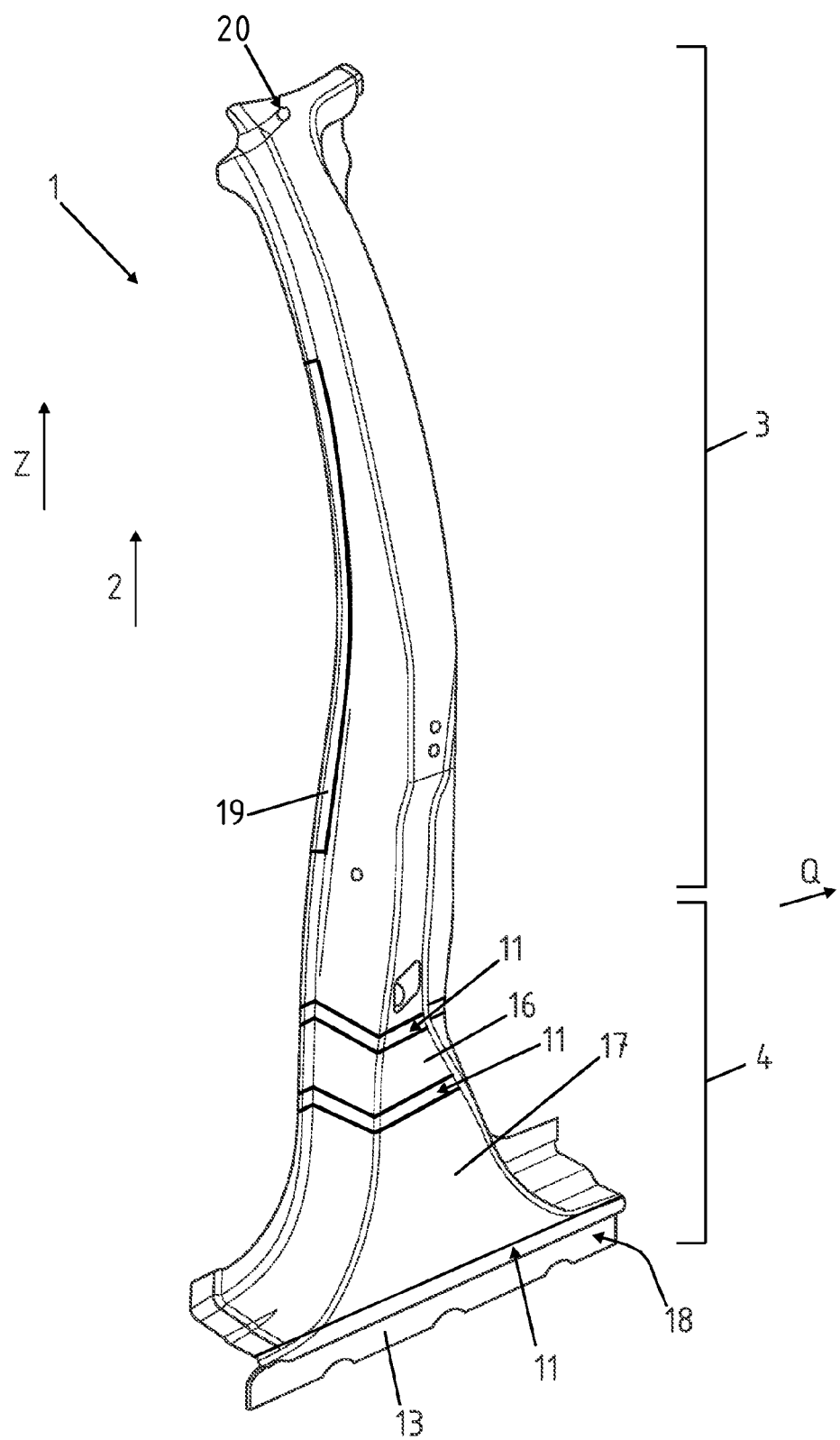
FIG. 6 shows the B pillar of FIG. 5 in an alternative embodiment.

The upper length section 3 may, in cross section, be of fully hardened form, as shown in FIG. 5. It is however also possible for joining flanges to have a soft material structure, in particular for mechanical or cohesive coupling to a closing plate, a reinforcement insert of an outer B pillar or outer skin or the roof frame. It is thus possible, as illustrated in FIG. 6, for a lateral flange 19 to be formed with soft material structure. Alternatively or in addition, it is also possible for an upper flange 20 for connection to a roof frame or roof beam to be formed with a soft material structure. In between, in a manner which is not illustrated, there is then formed in each case a transition region or transition section from soft to hard material structure.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A hardened steel alloy B pillar for a motor vehicle, comprising:
    a lower length section extending over less than 40% of the length (L) of the B pillar in a longitudinal direction and at least regionally has different strength values in relation to an upper length section,
    wherein in the lower length section, in at least one cross section, at least two regions with mutually different strengths are formed, and in the lower length section, a soft material structure is formed regionally,
    wherein the B pillar is, in cross section, at least over sections of the length, in the form of a hat-shaped profile, having a web, having limbs which project from the web and having flanges which project from the limbs, and in that the flanges have, in the lower length section, a super-high-strength material structure, and in that the region with soft material structure is formed in the web and extends at least regionally in the longitudinal direction.

2. A hardened steel alloy B pillar for a motor vehicle, comprising:
    a lower length section extending over less than 40% of the length (L) of the B pillar in a longitudinal direction and at least regionally has different strength values in relation to an upper length section,
    wherein in the lower length section, an upper part has a soft material structure, a middle part has a hard material structure and a lower part has a soft material structure, wherein each cross section at least in the lower length section has a homogeneous material structure, and in that the lower part extends in the longitudinal direction via a sill flange.

3. The hardened steel alloy B pillar according to claim 2, wherein in cross section, at least over sections of the length, in the form of a hat-shaped profile, include a web and limbs which project from the web and having flanges which project from the limbs, and in that the flanges have, in the lower length section, a super-high-strength material structure.

4. The hardened steel alloy B pillar according to claim 1, wherein the lower length section extends over less than 35%, in particular less than 30%, the length (L) of the B pillar.

5. The hardened steel alloy B pillar according to claim 1, wherein the region with soft material structure is formed in the web and extends in the longitudinal direction over the entirety of the lower length section.

6. The hardened steel alloy B pillar according to claim 5, wherein a transition section is formed between upper length section and lower length section, and/or in each case one transition section is formed between upper part and middle part and between middle part and lower part of the lower length section, the transition section preferably extending over less than 100 mm, in particular less than 50 mm, particularly preferably less than 30 mm in the longitudinal direction, and the transition region extending over less than 100 mm, in particular less than 50 mm, particularly preferably less than 30 mm, in the transverse direction (Q).

7. The hardened steel alloy B pillar according to claim 6, wherein a sill flange is formed on the lower end, wherein the sill flange preferably extends over the entire width (B) of the lower end and a soft material structure is formed in the sill flange, and wherein being provided in particular that the lower part of the lower length section is in the form of a sill flange.

8. The hardened steel alloy B pillar according to claim 7, wherein the soft material structure is formed so as to transition from the web into the sill flange, or in that a transition section is formed between soft material structure and sill flange.

9. The hardened steel alloy B pillar according to claim 8, wherein the upper length section has a super-high-strength material structure fully hardened or the upper length section is at least regionally hardened.

10. The hardened steel alloy B pillar according to claim 9, wherein the limbs are, in the transverse direction (Q), formed as a transition region between soft region of the web and super-high-strength flange.

11. The hardened steel alloy B pillar according to claim 10, wherein the super-high-strength material structure has a tensile strength of greater than 1100 MPa, and the soft material structure has a tensile strength of less than 1000 MPa.

* * * * *